(12) United States Patent
Otsuki et al.

(10) Patent No.: US 10,180,095 B2
(45) Date of Patent: Jan. 15, 2019

(54) SELECTIVE NOX REDUCTION CATALYST

(71) Applicant: TOYOTA JIDOSHA KABUSHIKI KAISHA, Toyota-shi, Aichi (JP)

(72) Inventors: Hiroshi Otsuki, Gotenba (JP); Hiromasa Nishioka, Susono (JP); Yoshihisa Tsukamoto, Susono (JP); Yasumasa Notake, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 123 days.

(21) Appl. No.: 15/119,004

(22) PCT Filed: Feb. 23, 2015

(86) PCT No.: PCT/JP2015/000882
§ 371 (c)(1),
(2) Date: Aug. 15, 2016

(87) PCT Pub. No.: WO2015/125496
PCT Pub. Date: Aug. 27, 2015

(65) Prior Publication Data
US 2016/0363024 A1 Dec. 15, 2016

(30) Foreign Application Priority Data
Feb. 21, 2014 (JP) ................. 2014-031549

(51) Int. Cl.
| | | |
|---|---|---|
| B01J 29/06 | (2006.01) | |
| F01N 3/20 | (2006.01) | |
| B01J 35/00 | (2006.01) | |
| B01J 37/30 | (2006.01) | |
| B01D 53/94 | (2006.01) | |
| B01J 29/064 | (2006.01) | |
| B01J 29/76 | (2006.01) | |
| B01J 29/072 | (2006.01) | |

(52) U.S. Cl.
CPC ....... *F01N 3/2066* (2013.01); *B01D 53/9418* (2013.01); *B01J 29/064* (2013.01); *B01J 29/072* (2013.01); *B01J 29/76* (2013.01); *B01J 35/0006* (2013.01); *B01J 35/008* (2013.01); *B01J 35/0073* (2013.01); *B01J 35/0086* (2013.01); *B01J 37/30* (2013.01); *B01D 2251/2062* (2013.01); *B01D 2255/20738* (2013.01); *B01D 2255/20761* (2013.01); *B01D 2255/50* (2013.01); *B01J 2029/062* (2013.01); *B01J 2229/183* (2013.01); *B01J 2229/186* (2013.01); *F01N 2370/02* (2013.01); *F01N 2370/04* (2013.01); *F01N 2610/02* (2013.01); *Y02T 10/24* (2013.01)

(58) Field of Classification Search
CPC ........ B01J 29/072; B01J 29/76; B01J 29/064; B01J 2229/186; B01J 35/0006; B01J 35/0073; B01J 35/0066; B01J 35/008; B01J 35/0086; B01J 37/30; B01D 53/9418; B01D 2255/50
USPC .................................................. 502/60, 74
See application file for complete search history.

(56) References Cited

U.S. PATENT DOCUMENTS

| | | | |
|---|---|---|---|
| 5,116,586 A | 5/1992 | Baacke et al. | |
| 5,270,024 A | 12/1993 | Kasahara et al. | |
| 8,987,161 B2 * | 3/2015 | Narula ............... | B01D 53/9418 422/177 |
| 8,987,162 B2 * | 3/2015 | Narula ............... | B01D 53/9418 423/700 |
| 2008/0241060 A1 | 10/2008 | Li et al. | |
| 2009/0263304 A1 | 10/2009 | Yoshida et al. | |
| 2010/0092361 A1 | 4/2010 | Li et al. | |

(Continued)

FOREIGN PATENT DOCUMENTS

| | | |
|---|---|---|
| EP | 0 376 025 A1 | 7/1990 |
| EP | 1 967 264 A1 | 9/2008 |

(Continued)

OTHER PUBLICATIONS

Kucherov et al., "ESR study of competition between Fe3+ and Cu2+ active sites for NOx selective catalytic reduction by NH3 in Cu—Fe-Beta catalyst", Journal of Molecular Catalysis A: Chemical 325(2010), pp. 73-78.*

(Continued)

*Primary Examiner* — Elizabeth D Wood
(74) *Attorney, Agent, or Firm* — Finnegan, Henderson, Farabow, Garrett & Dunner, LLP

(57) ABSTRACT

A NOx catalyst is provided that can realize a favorable NOx reduction in a broad temperature region and that can lighten the overhead involved in production. The NOx catalyst has active components exhibiting a selective reduction activity for NOx, wherein the active components exhibiting the selective reduction activity contains a high-temperature active component having a relatively high NOx reduction activity at high temperatures and a low-temperature active component having a relatively high NOx reduction activity at low temperatures; and the high-temperature active component and the low-temperature active component are disposed in a mixed state in a primary particle of the catalyst particle, and an active component ratio on a surface side of the primary particle is larger than an active component ratio on an interior side of the primary particle, with the active component ratio being is a ratio of a concentration of the high-temperature active component to a concentration of the low-temperature active component in the primary particle.

4 Claims, 7 Drawing Sheets

(56) References Cited

U.S. PATENT DOCUMENTS

| | | |
|---|---|---|
| 2010/0092362 A1 | 4/2010 | Li et al. |
| 2010/0143223 A1 | 6/2010 | Ando et al. |
| 2011/0070140 A1 | 3/2011 | Yoshida et al. |
| 2012/0039759 A1* | 2/2012 | Narula ............... B01D 53/9418 422/179 |
| 2012/0093702 A1* | 4/2012 | Andersen ........... B01D 53/8628 423/210 |
| 2012/0275977 A1 | 11/2012 | Chandler et al. |
| 2013/0136677 A1 | 5/2013 | Chandler et al. |

FOREIGN PATENT DOCUMENTS

| | | |
|---|---|---|
| JP | H02194819 A | 8/1990 |
| JP | H03135437 A | 6/1991 |
| JP | 2008-221203 | 9/2008 |
| JP | 2010-499 | 1/2010 |
| JP | 2011-125849 | 6/2011 |
| JP | 2011-167690 | 9/2011 |
| JP | 2013-13894 | 1/2013 |
| WO | WO 2007/074599 A1 | 7/2007 |
| WO | WO 2013/126619 A1 | 8/2013 |

OTHER PUBLICATIONS

A. Sultana et al., "Tuning the NOx Conversion of Cu—Fe/ZSM-5 Catalyst in $NH_3$-SCR," Catalysis Communications, vol. 41 (2013) pp. 21-25.

* cited by examiner

[Fig. 1]
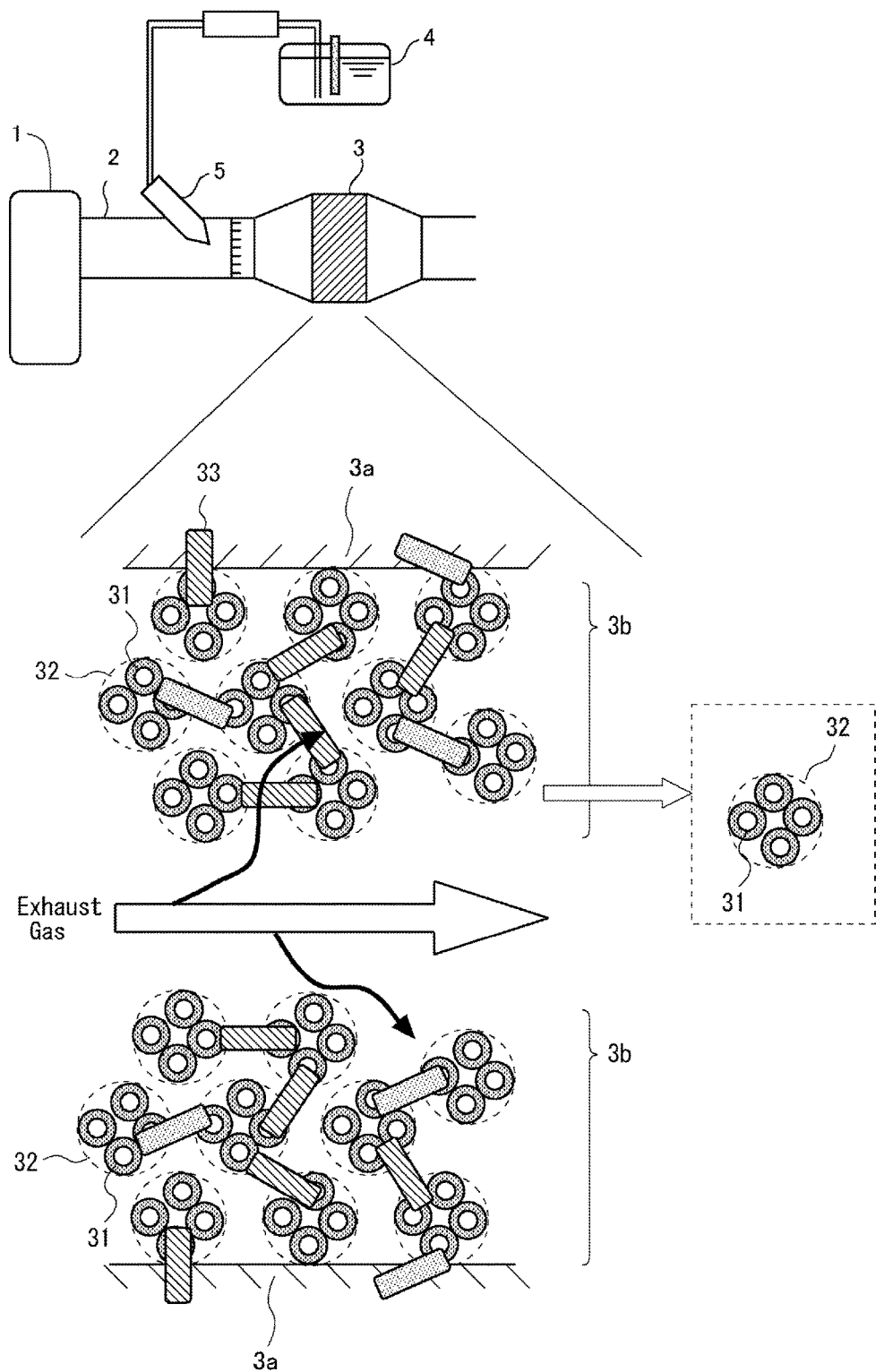

[Fig. 2]
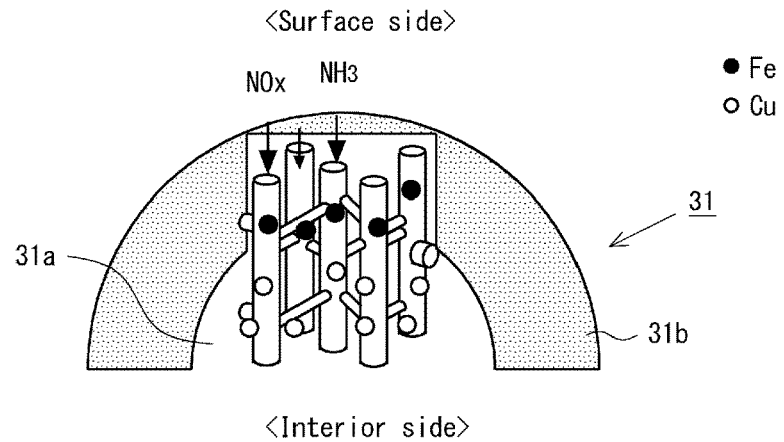
[Fig. 3]
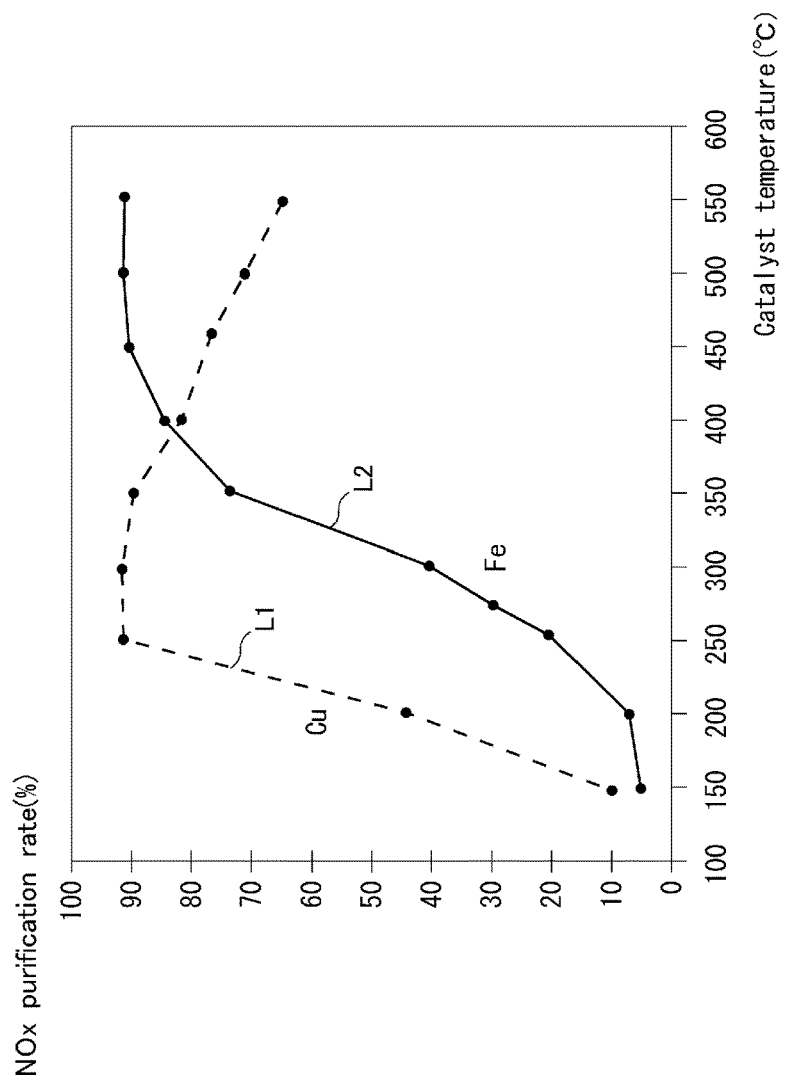

[Fig. 4]
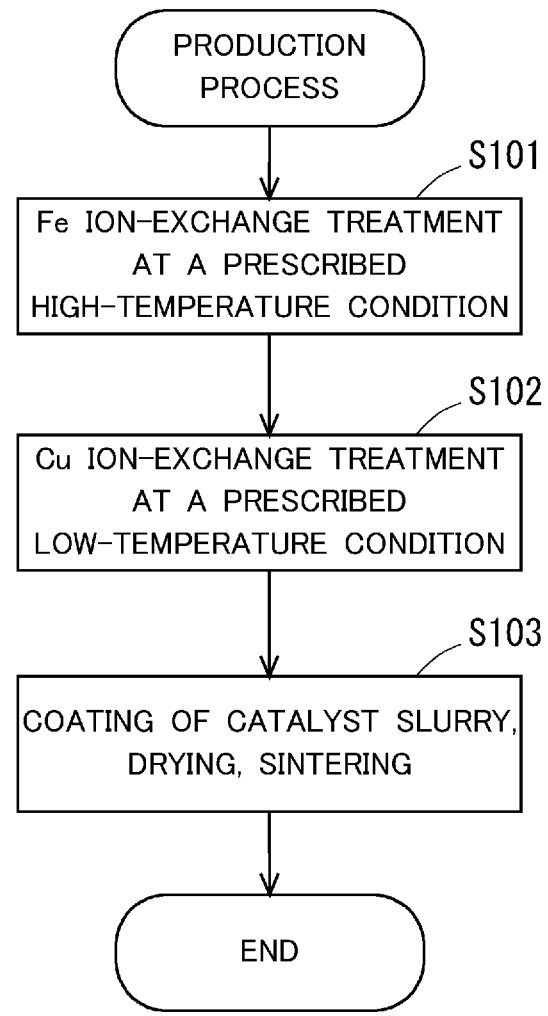

[Fig. 5]
(a)
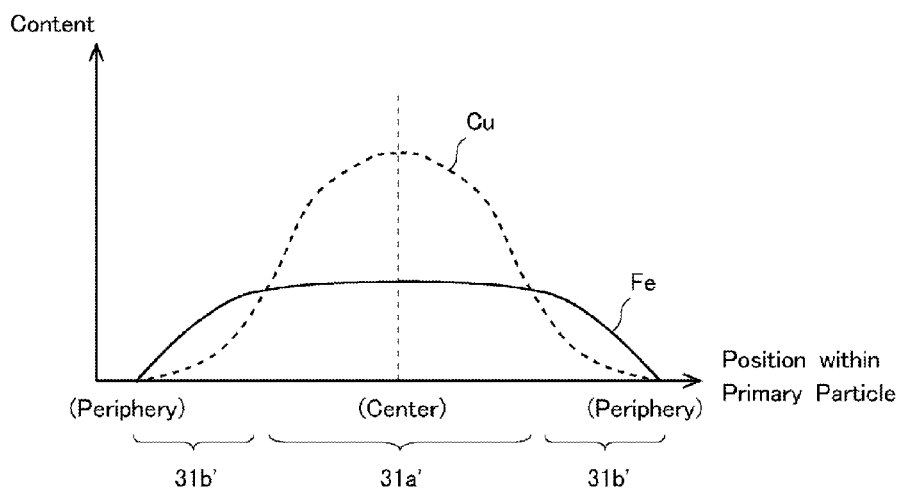
(b)
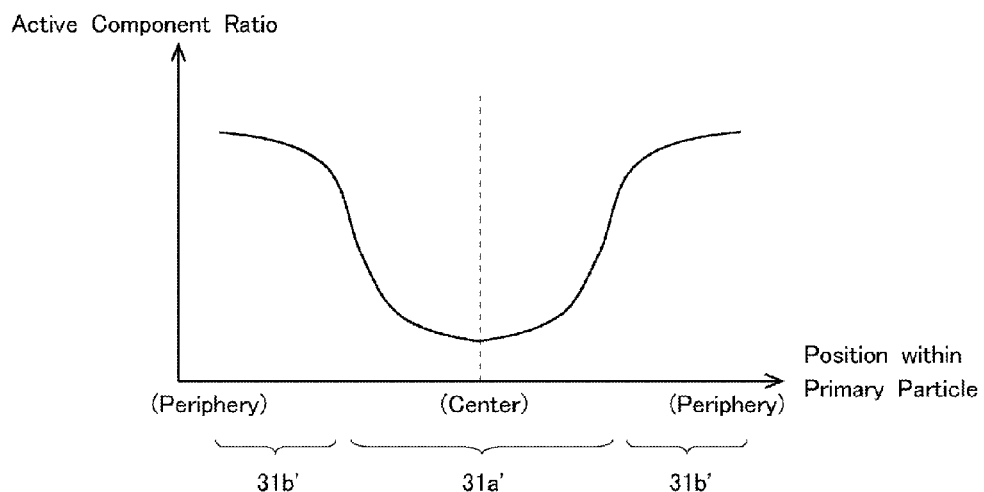

[Fig. 6]
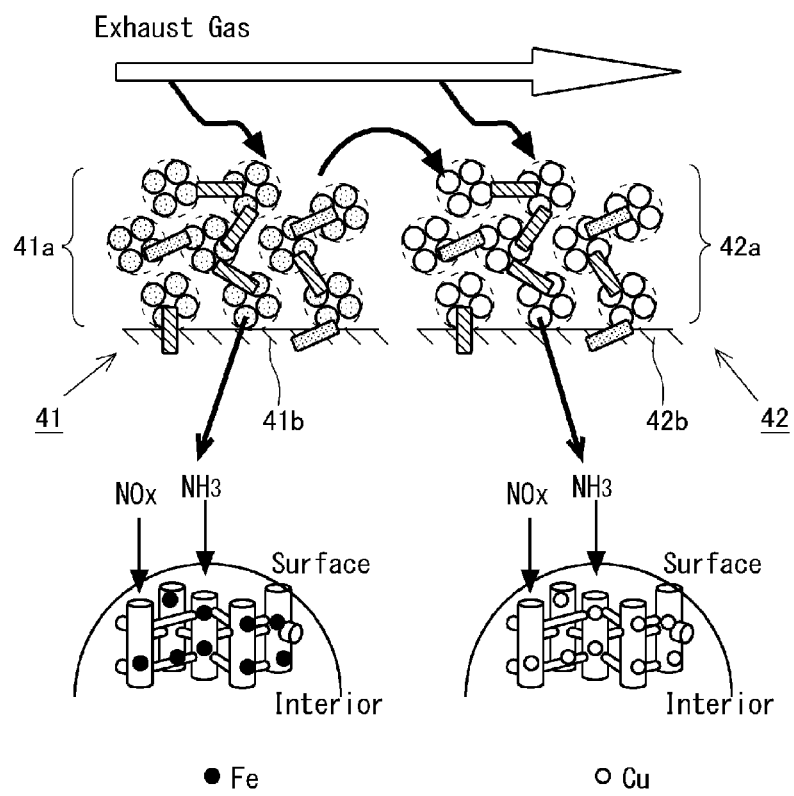
[Fig. 7]
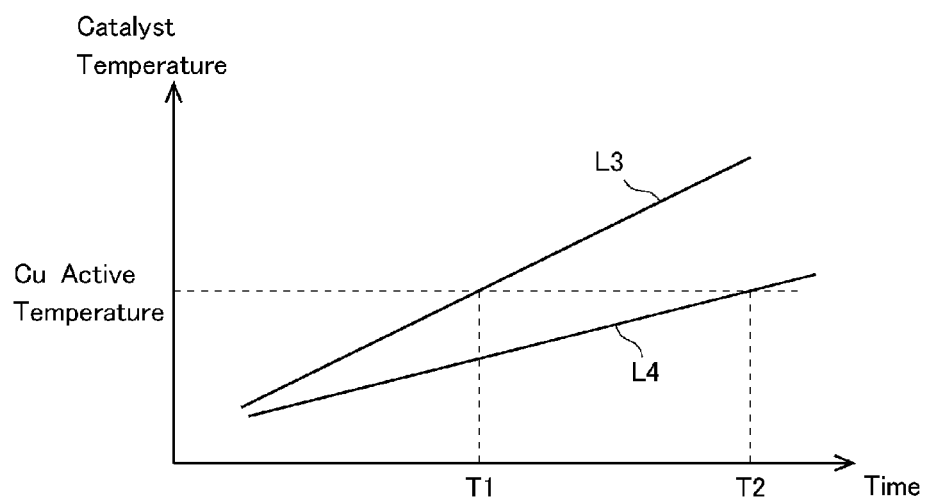

[Fig. 8]
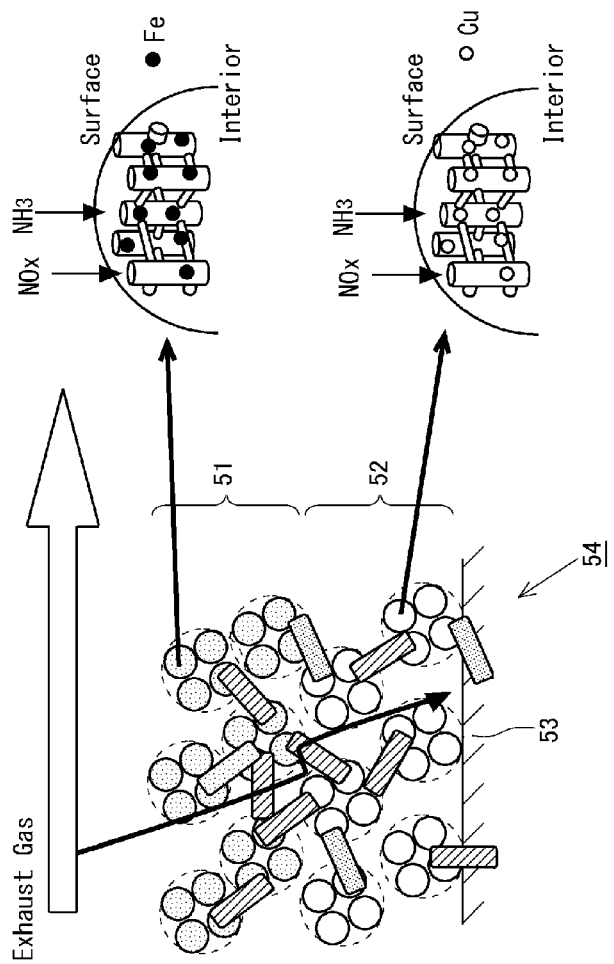
[Fig. 9]
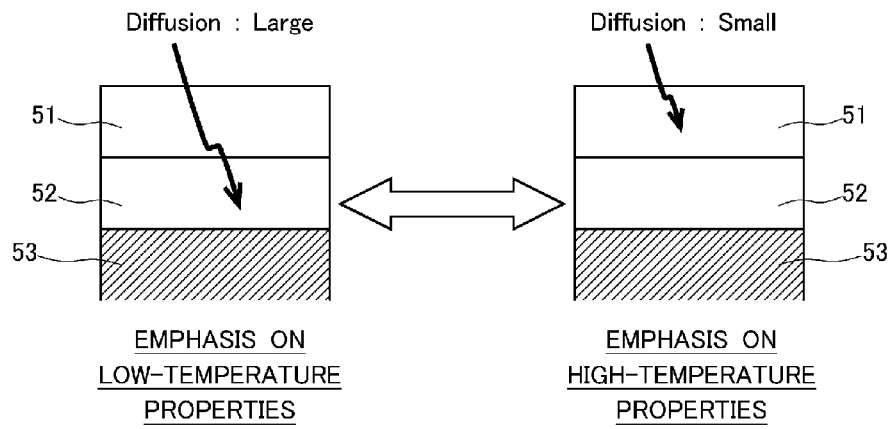

[Fig. 10]
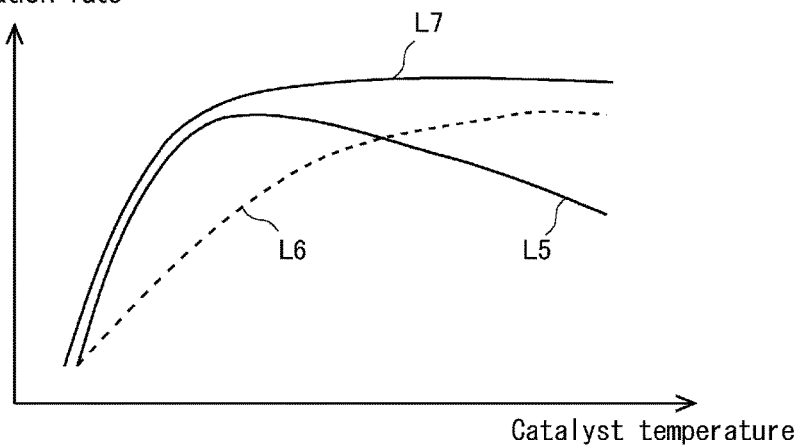

SELECTIVE NOX REDUCTION CATALYST

CROSS-REFERENCE TO RELATED APPLICATIONS

This application is a national phase application of International Application No. PCT/JP2015/000882, filed Feb. 23, 2015, and claims the priority of Japanese Application No. 2014-031549, filed Feb. 21, 2014, the content of both of which is incorporated herein by reference.

TECHNICAL FIELD

The present invention relates to a selective NOx reduction catalyst.

BACKGROUND ART

A selective NOx reduction catalyst (also referred to in the following simply as an "NOx catalyst") for effecting the reductive purification of the NOx in an exhaust gas may be provided in the exhaust gas line of an internal combustion engine. For example, it is known that an NOx catalyst may be formed by supporting at least one active component that exhibits a selective reduction activity for NOx, e.g., Fe, Cu, and so forth through ion-exchange, within the pores of a zeolite, as in the art described in Patent Document 1.

In addition, with the NOx catalysts disclosed in Patent Documents 2 and 3, an improvement in the purification rate for the NOx in exhaust gas is devised by the disposition in the exhaust gas line of a suitable combination of a first zeolite provided by ion-exchanging a zeolite crystal with Cu and a second zeolite provided by ion-exchanging a zeolite crystal with Fe. Patent Document 4 discloses an NOx catalyst formed so as to have, for a lower layer, a layer in which a zeolite crystal has been ion-exchanged with Fe, and, for an upper layer, a layer in which a zeolite crystal has been ion-exchanged with Cu.

[Patent Document 1] Japanese Patent Application Laid-open No. 2008-221203
[Patent Document 2] Japanese Patent Application Laid-open No. 2010-499
[Patent Document 3] Japanese Patent Application Laid-open No. 2011-125849
[Patent Document 4] Japanese Patent Application Laid-open No. 2013-13894
[Patent Document 5] Japanese Patent Application Laid-open No. 2011-167690

DISCLOSURE OF THE INVENTION

Fe and Cu are examples of active components that exhibit a selective reduction activity for NOx and are used in NOx catalysts. NOx catalysts formed by ion-exchanging a zeolite crystal with Fe (referred to herebelow as "Fe-exchanged NOx catalysts") tend to have a high NOx purification performance at relatively high temperatures. On the other hand, NOx catalysts formed by ion-exchanging a zeolite crystal with Cu (referred to herebelow as "Cu-exchanged NOx catalysts") tend to have a high NOx purification performance at relatively low temperatures and in addition have a strong tendency at high temperatures to produce NOx by the oxidation of the ammonia used as a reducing agent for NOx reductive purification. Due to this, in an NOx catalyst adopted in an internal combustion engine, it is quite difficult to obtain an acceptable NOx purification performance unless the structure of the NOx catalyst is judiciously adjusted based on, for example, the temperature environment in which the NOx catalyst will be placed.

However, with regard to the formation of NOx catalysts, the prior art does not go beyond investigations into, for example, broadening the operating temperature region for the NOx catalyst as a whole through suitable combinations of an Fe-exchanged NOx catalyst with a Cu-exchanged NOx catalyst. It is difficult for such combination structures to realize a favorable NOx purification performance for the NOx catalyst as a whole because the oxidation activity exhibited by Cu-exchanged NOx catalysts at high temperatures results in the development of a conversion to NOx in which the ammonia used as a reducing agent for NOx reductive purification is oxidized.

In another prior art, a single NOx catalyst is formed by, for example, executing the catalyst layer as two layers by separately coating a catalyst substrate with an Fe-exchanged NOx catalyst and a Cu-exchanged NOx catalyst. By doing this, a difference in the priority of contact with NOx is set up between the Fe-exchanged NOx catalyst and the Cu-exchanged NOx catalyst, thus achieving an attenuation of the negative effects due to the aforementioned oxidation activity of the Cu-exchanged NOx catalyst. However, when attempting to inhibit the oxidation activity of the Cu-exchanged NOx catalyst using such an NOx catalyst having a two-layer catalyst layer, the NOx purification performance may be reduced even in the temperature region in which the Cu-exchanged NOx catalyst can natively carry out a favorable NOx purification. It is thus difficult with such an NOx catalyst to broaden the operating temperature region in which a high NOx purification performance can be exhibited.

The present invention was achieved considering the problems described above and has as an object the introduction of a selective NOx reduction catalyst that can realize a favorable NOx purification in a broad temperature region and that can lighten the overhead involved in its production.

To address such problems, the present invention is a selective NOx reduction catalyst that has, on a catalyst substrate, a catalyst layer of a catalyst particle formed by ion-exchanging a zeolite crystal with active components having a selective reduction activity for NOx, wherein the active components exhibiting the selective reduction activity contains a high-temperature active component containing a high NOx reduction activity at high temperatures and a low-temperature active component having a high NOx reduction activity at low temperatures, and the high-temperature active component and the low-temperature active component are disposed in a mixed state in a primary particle of the catalyst particle, and an active component ratio on a surface side of the primary particle is larger than an active component ratio on an interior side of the primary particle, with the active component ratio being a ratio of a concentration of the high-temperature active component to a concentration of the low-temperature active component in the primary particle (=concentration of the high-temperature active component/concentration of the low-temperature active component).

The selective NOx reduction catalyst according to the present invention contains, as the active component having a selective reduction activity for NOx, at least a high-temperature active component and a low-temperature active component ion-exchanged into the pores of the primary particles of the catalyst particle. With such a structure, an NOx reductive purification is realized through the opportunity for contact by the NOx and ammonia reducing agent with the high-temperature active component and the low-temperature active component as the NOx and ammonia reducing agent diffuse within the pores of the primary particles. Here, the ratio between the high-temperature active component and the low-temperature active component has been adjusted as a function of the location within the primary particle so that the high-temperature active component is more abundant, i.e., the active component ratio is higher, in the pores at the surface side of the primary particle than in the pores at the interior side of the primary particle. In addition, the catalyst layer in the selective NOx reduction catalyst is formed by the disposition on a catalyst substrate of secondary particles formed from these primary particles. Fe is an example of the high-temperature active component and Cu is an example of the low-temperature active component.

In the primary particles of the catalyst particles present in this catalyst layer in the thusly structured selective NOx reduction catalyst, at the surface side the high-temperature active component is present in the pores at a higher concentration than is the low-temperature active component, while at the interior side the low-temperature active component is present in the pores at a higher concentration than is the high-temperature active component. Accordingly, at low temperatures, although the selective reduction activity of the high-temperature active component—which is disposed at the surface side of the primary particle in a higher concentration in the pores than is the low-temperature active component—is in an inhibited state, a favorable reductive purification of the NOx can be expected due to the selective reduction activity of the low-temperature active component—which is disposed at the interior side of the primary particle in a higher concentration in the pores than is the high-temperature active component. In addition, at high temperatures, a favorable reductive purification of the NOx can be expected due to the selective reduction activity of the high-temperature active component—which is disposed at the surface side of the primary particle in a higher concentration in the pores than is the low-temperature active component. At this time, the high-temperature oxidation activity-capable low-temperature active component (for example, Cu), due to its disposition in the pores at a higher concentration than for the high-temperature active component at the interior side of the primary particle, has less opportunity for contact with the ammonia reducing agent used for NOx reduction than does the high-temperature active component. As a consequence, the ammonia is largely consumed by the NOx reduction reaction in the pores on the surface side and as a result a situation is set up in which the ammonia is restrained from reaching into the pores at the interior side of the primary particle where the low-temperature active component is disposed at a higher concentration than the high-temperature active component. Moreover, even if conversion to NOx should occur due to oxidation of the ammonia by contact with the low-temperature active component, this NOx is provided to the reduction reaction due to the opportunity for re-contact with the high-temperature active component in the pores on the surface side. As a result, the conversion of ammonia to NOx at high temperatures can be inhibited and it then becomes possible to broaden the operating temperature region at which the selective NOx reduction catalyst can exhibit a favorable NOx purification rate.

The catalyst layer disposed on the catalyst substrate is formed by secondary particles that contain primary particles that have the active component ratio distribution described above (also referred to herebelow as the "prescribed distribution"). Accordingly, the catalyst particles coated on the catalyst substrate in the selective NOx reduction catalyst according to the present invention are of one type and production is then made possible without going through a complex process as in the prior art of, for example, making the catalyst layer into two layers by the separate application of different types of catalyst particles. Stated differently, the selective NOx reduction catalyst according to the present invention makes it possible to maintain an advantageous production quality using a simple production process and thus can lighten the production overhead therefor.

The catalyst layer here may be disposed on the catalyst substrate in this selective NOx reduction catalyst with the resistance to NOx diffusion in the catalyst layer formed by the catalyst particles disposed on the catalyst substrate becoming approximately uniform in the thickness direction of the catalyst layer. As has been described in the preceding, with the selective NOx reduction catalyst according to the present invention, a state is provided in which the high-temperature active component and low-temperature active component are mixed in the prescribed distribution in the primary particles, while secondary particles of these catalyst particles form the catalyst layer. Due to this, the broadening of the operating temperature region described above can be realized by coating the catalyst particles on the catalyst substrate without requiring, in the production of the selective NOx reduction catalyst, a complicated production process for changing the resistance to NOx diffusion in the thickness direction of the catalyst layer. In particular, the entire mass of the disposed catalyst particles can be efficiently utilized for NOx reductive purification by having the resistance to NOx diffusion be approximately uniform in the thickness direction of the catalyst layer.

The following two modes for the prescribed distribution are examples whereby each of the active components can efficiently perform NOx reductive purification at high and low temperatures. First, in a first mode, a prescribed distribution may be used in which, in the primary particles in the hereabove-described selective NOx reduction catalyst, the active component ratio declines gradually from the surface side of the primary particle to an interior side thereof. By having the proportion of the low-temperature active component increase moving toward the center of this primary particle, in particular at high temperatures the conversion of the ammonia reducing agent to NOx can be inhibited while the reductive purification of NOx is still efficiently carried out.

In a second mode, a prescribed distribution may be used in which, in the primary particles in the hereabove-described selective NOx reduction catalyst, a low-temperature active region having a relatively lower active component ratio is formed on the interior side of the primary particle and a high-temperature active region having a relatively higher active component ratio is formed on the surface side of the primary particle. By disposing these individual regions at the surface side and interior side of this primary particle, in the same manner at high temperatures the conversion of the ammonia reducing agent to NOx can be inhibited and reductive purification of NOx can be efficiently carried out, while an efficient NOx reductive purification is made possible at low temperatures.

The present invention can provide a selective NOx reduction catalyst that can realize a favorable NOx purification in a broad temperature region and that can lighten the overhead involved in its production.

BRIEF DESCRIPTION OF DRAWINGS

FIG. 1 is a diagram that shows the schematic structure of the selective NOx reduction catalyst according to the present invention;

FIG. 2 is a diagram that shows the schematic structure of a primary particle in the selective NOx reduction catalyst according to the present invention;

FIG. 3 is a diagram that shows the correlation between catalyst temperature and the selective reduction performance for NOx, for Cu and Fe as the active component in a selective NOx reduction catalyst;

FIG. 4 is a diagram that shows the flow for the production of the selective NOx reduction catalyst according to the present invention;

FIG. 5 is a diagram that shows the results of measurements carried out on the selective NOx reduction catalyst according to the present invention with an analytical instrument that uses energy-dispersive x-ray spectroscopy attached to a transmission electron microscope;

FIG. 6 is a diagram that shows the schematic structure of a selective NOx reduction catalyst with a tandem structure according to the prior art;

FIG. 7 is a diagram that shows a comparison, for catalyst warm up during a cold start, between the selective NOx reduction catalyst according to the present invention and a selective NOx reduction catalyst having a tandem structure in accordance with the prior art;

FIG. 8 is a diagram that shows a schematic structure for a two-layer coated selective NOx reduction catalyst according to the prior art;

FIG. 9 is a diagram that describes the correlation between the degree of diffusion of gas in the catalyst layers and the temperature characteristics, for a two-layer coated selective NOx reduction catalyst according to the prior art; and FIG. 10 is a diagram that compares the selective NOx reduction catalyst according to the present invention with a two-layer coated selective NOx reduction catalyst according to the prior art, with regard to the correlation between the selective reduction performance for NOx and catalyst temperature.

BEST MODE FOR CARRYING OUT THE INVENTION

Specific embodiments of the present invention are described in the following based on the drawings. Unless specifically indicated otherwise, the technical scope of the present invention should not be construed as being limited to only the dimensions, materials, shapes, relative arrangements, and so forth of the structural components described in these examples.

Example 1

An example of the selective NOx reduction catalyst according to the present invention (also referred to herebelow simply as the "NOx catalyst") will be described based on the drawings appended to this Description. FIG. 1 shows in its upper part an exhaust gas purification apparatus for an internal combustion engine 1, wherein the exhaust gas purification apparatus is equipped with the NOx catalyst 3 according to this example, and shows in its lower part a model structure for the NOx catalyst 3. The internal combustion engine 1 shown in FIG. 1 is a diesel engine for powering a vehicle. However, the internal combustion engine 1 is not limited to diesel engines and may be, for example, a gasoline engine. A description of, inter alia, the intake system and the EGR apparatus, which recirculates a portion of the exhaust gas flowing in the exhaust gas conduit 2 to the intake system, of the internal combustion engine 1 is omitted from FIG. 1.

The NOx catalyst 3, which selectively reduces the NOx in the exhaust gas using ammonia as the reducing agent, is disposed in the exhaust gas conduit 2 of the internal combustion engine 1. Aqueous urea—which is an ammonia precursor and is stored in the urea tank 4 in order to generate the ammonia used as the reducing agent at the NOx catalyst 3—is fed into the exhaust gas by a feed valve 5 that is positioned on the upstream side of the NOx catalyst 3. The aqueous urea fed from a feed valve 5 undergoes hydrolysis under the effect of the heat of the exhaust gas and ammonia is thereby produced, and this ammonia, in accordance with the indicated sequence, flows into the NOx catalyst 3 and is adsorbed thereto and a reduction reaction between the adsorbed ammonia and the NOx in the exhaust gas (for example, the reaction according to the following equation 1) is produced and NOx purification is thereby carried out.

$$NO + NO_2 + 2NH_3 \rightarrow 2N_2 + 3H_2O \qquad \text{equation 1}$$

Aqueous urea is fed in this example through the feed valve 5 as indicated above, but this may be replaced by the direct feed of ammonia or aqueous ammonia into the exhaust gas. In addition, an oxidation catalyst may be disposed downstream from the NOx catalyst 3 in order to oxidize the ammonia that has slipped therethrough.

The NOx catalyst 3 has a catalyst layer 3b formed by a process in which a catalyst particle-containing slurry is coated on a catalyst substrate 3a followed by drying and sintering. The production process for the NOx catalyst 3 is described below. As shown by the outset dashed-line rectangle, a secondary particle 32 in the catalyst layer 3b is formed by the aggregation of a plurality of a primary particle 31, which is itself formed by the ion-exchange of a portion of a zeolite crystal with an active component (Cu and Fe as described below) that exhibits a selective reduction activity on the NOx in the exhaust gas, and these secondary particles 32 are bonded with each other by a binder 33 and are thereby tightly bonded on the catalyst substrate 3a as the catalyst layer 3b. The exhaust gas flows into the thusly structured NOx catalyst 3, and as a result the NOx in the exhaust gas diffuses, along with the ammonia reducing agent, within the catalyst layer 3b, i.e., within the zeolite pores of the primary particle 31, and is supplied within the primary particle 31 to a selective NOx reduction reaction in accordance with, e.g., the equation 1 given above. In this Description, the primary particle is determined from the geometric form for the appearance of the catalyst particles and is regarded as the particle that may be considered to be the unit particle. The secondary particle is formed by the aggregation of a plurality of the primary particles. Accordingly, the aggregated form presented by the secondary particles can vary with the environment (temperature, humidity, and so forth) in which the catalyst particles are placed, and the number of primary particles present in the secondary particle is not necessarily constant.

The structure of the primary particles 31 of the catalyst particles present in the catalyst layer 3b is described here based on FIG. 2. FIG. 2 shows a schematic structure of a primary particle 31. The active component used in a selective NOx reduction catalyst is selected as appropriate based on, for example, the operating temperature environment where the NOx catalyst will carry out reductive purification. As an example, FIG. 3 shows the correlation between the reductive purification performance (NOx purification rate) and the catalyst temperature for Cu and Fe as active components for the case of the ion-exchange of the active components into a zeolite crystal. As shown here, Cu can exhibit an excellent reductive purification performance in the temperature region from about 250 degrees C. to 400 degrees C., while Fe on the other hand can exhibit an excellent reductive purification performance when the catalyst temperature is at or above 400 degrees C. This occurs because in the high-temperature region Cu readily exhibits selectivity for reactions between oxygen and the reducing agent, and as a consequence the ammonia reducing agent ends up being oxidized by the oxygen rather than the NOx in the exhaust gas with the result that the Cu undergoes a decline in its reductive purification performance in the high-temperature region.

Considering these properties for each of the Cu and Fe active components, in the primary particle 31 that forms the NOx catalyst 3 according to the present invention, a portion of the zeolite crystal is ion-exchanged with Cu, which has a high selective reduction activity for NOx at low temperatures, and with Fe, which has a high selective reduction activity for NOx at high temperatures. More specifically, the prescribed distribution—in which on the surface side the Fe is present in the pores of the primary particle 31 at a higher concentration than for the Cu and on the interior side the Cu is present in the pores of the primary particle at a higher concentration than for the Fe—is formed within the primary particle 31 by ion-exchanging the Fe in the pores of the primary particle 31 in larger amounts than the Cu on the surface side and by ion-exchanging the Cu in the pores in larger amounts than the Fe on the interior side. This prescribed distribution is a distribution in which in primary particle 31, the active component ratio is larger on the surface side than on the interior side, where the active component ratio is the ratio of the concentration of Fe, which has a high selective reduction activity at high temperatures, to the concentration of Cu, which has a high selective reduction activity at low temperatures.

As a result, the NOx in the exhaust gas, in the process of diffusing along with the ammonia within the particle pores from the exterior of the primary particle 31, traverses the high-temperature active region 31b, in which the Fe functioning as the high-temperature active component is present at a higher concentration than the Cu, and after this reaches the low-temperature active region 31a, in which the Cu functioning as the low-temperature active component is present at a higher concentration than the Fe. The NOx catalyst 3 having a catalyst layer 3b that contains a primary particle 31 formed in this manner has both an excellent selective reduction performance in the low-temperature region due to the Cu and an excellent selective reduction performance in the high-temperature region due to the Fe. That is, when the NOx catalyst 3 resides in a low-temperature state (for example, 250 degrees C. to 400 degrees C.), since the selective reduction performance of the Fe present in the primary particle 31 is in a suppressed state, the NOx and ammonia diffusing within the catalyst particle pass through the high-temperature active region 31b and are mainly supplied to the NOx reduction reaction given by equation 1 in the low-temperature active region 31a. The NOx catalyst 3, thus being supported by the selective reduction performance due to the low-temperature active region 31a within each primary particle 31 present in the catalyst layer 3b, is then able to exhibit a favorable NOx purification performance.

When, on the other hand, the NOx catalyst 3 resides in a high-temperature state (for example, at or above 400 degrees C.), this is a state in which the selective reduction performance of the Fe present in the primary particle 31 can be thoroughly exhibited. In addition, for the Cu present in the primary particle 31, the selectivity for oxygen and ammonia becomes substantial and its selective reduction activity for NOx declines. However, the high-temperature active region 31b is disposed on the surface side of the primary particle 31 and the low-temperature active region 31a is disposed on its interior side. Due to this, when the NOx catalyst 3 resides in a high-temperature state, the NOx and ammonia diffusing within the catalyst particle are first provided to the NOx reduction reaction of equation 1 in the high-temperature active region 31b and after passing through this reach the low-temperature active region 31a. When the NOx catalyst 3 is at a high temperature, the ammonia reducing agent is consumed due to the NOx reductive purification in the high-temperature active region 31b and as a consequence the amount of ammonia reaching the low-temperature active region 31a is reduced and NOx production due to the oxidation of ammonia at the low-temperature active region 31a can be suppressed. The NOx catalyst 3 can as a result provide a broad operating region from the low-temperature region into the high-temperature region.

A process for producing the NOx catalyst 3 will now be described based on FIG. 4. The NOx catalyst 3 according to the present invention is produced by forming a catalyst layer 3b on a substrate wall by coating a catalyst substrate with a catalyst slurry produced by ion-exchanging a portion of a zeolite crystal with active components (Cu and Fe in this example) that exhibit a selective reduction activity for NOx. The details of this production process are shown in the flow diagram in FIG. 4.

The distribution of the active components (Cu, Fe) within the zeolite crystal in the primary particle 31 can be adjusted here by controlling the relationship in the production process between the diffusion rate of the active components within the zeolite crystal and the reaction rate for ion-exchange at the acid sites of the zeolite crystal. Ion-exchange is a chemical reaction, and the ion-exchange rate is therefore readily substantially influenced by the temperature of the environment with the ion-exchange rate being higher in a higher temperature environment. On the other hand, the diffusion rate of the active components is less susceptible to the effect of the environmental temperature than is the ion-exchange rate. Accordingly, the distribution of the active components (Cu, Fe) within the primary particle 31 can be controlled primarily by adjusting, for example, the temperature conditions and the reaction time in the production process.

In specific terms, an ion-exchange treatment of the zeolite crystal with the Fe active component at a prescribed high-temperature condition is first carried out, in S101. By setting a prescribed high-temperature condition, the ion-exchange reaction of Fe occurs rapidly when the Fe active component diffuses into the interior of the zeolite crystal-containing primary particle and Fe-ion-exchanged sites are thereby formed. Since the Fe diffuses into the interior of the primary particle as the time used for the ion-exchange reaction is lengthened, the extent of formation of the Fe-ion-exchanged sites within the primary particle can be controlled through a judicious adjustment of this reaction time.

Then, in S102, an ion-exchange treatment with the Cu active component is carried out on the primary particle that has already been subjected to the ion-exchange treatment with Fe in S101. The temperature condition established for the ion-exchange treatment in this S102 is a prescribed low-temperature condition that resides at a lower temperature than the prescribed high-temperature condition in S101. Elution of the Fe that has been bonded by ion-exchange to the zeolite crystal in S101 can be prevented by establishing such a prescribed low-temperature condition. Moreover, since Fe has already been ion-exchanged into the pores of the primary particle on its surface side, the Cu active component diffusing within the zeolite crystal undergoes an ion-exchange reaction with the zeolite crystal in the pores mainly on the center side of the primary particle. The result is the production of a catalyst slurry that contains primary particles that have the prescribed distribution for Fe and Cu as shown in FIG. 2.

In S103, the NOx catalyst 3 is produced by coating the catalyst slurry produced in S102 on a catalyst substrate 3a and drying and sintering. The thickness of the catalyst layer 3b in the NOx catalyst 3 can be adjusted as appropriate through the catalyst slurry coating conditions in S103. As described in the preceding, the prescribed distribution is formed within the primary particle 31 in the NOx catalyst 3 according to the present invention, and the catalyst structure shown in FIG. 1 is formed by coating on the catalyst substrate 3a just the one type of catalyst slurry containing this primary particle 31 followed by drying and sintering. That is, the overhead involved in the production of the NOx catalyst 3 can be lessened because it can be produced without going through a complicated step such as, for example, the separate application of a plurality of catalyst slurry types.

FIG. 5 shows the results of measurements, carried out with an analytical instrument that uses Energy Dispersive X-ray analysis (EDX) attached to a transmission electron microscope, on a primary particle 31 produced according to the production process shown in FIG. 4. An analytical instrument that uses EDX attached to a transmission electron microscope can measure the component species and their amounts present in a measurement sample using the wavelength and intensity of the characteristic x-rays emitted from atoms that have been excited by an x-ray beam transmitted through the measurement sample. Such an EDX-equipped analytical instrument thus makes it possible to acquire the component distribution within a primary particle 31. In FIG. 5, (a) at the top shows the content level of the Cu and Fe active components in a cross section through approximately the center of a primary particle 31 used as the measurement target, while the (b) at the bottom shows the level of the active component ratio in the primary particle 31 in the same cross section. In specific terms, the horizontal axis in each graph in FIGS. 5(a) and 5(b) represents the position within the particle on the axis that approximately passes through the center within the primary particle 31, while the vertical axis in FIG. 5(a) shows the Cu content and Fe content as calculated based on the characteristic x-ray measurements and the vertical axis in FIG. 5(b) shows the active component ratio according to the present invention as calculated from these Cu and Fe contents. In FIG. 5(a), the course for Fe is shown by the solid line and the course for Cu is shown by the dashed line. As described above, the prescribed distribution is formed by the Fe and Cu active components within the primary particle 31. As a consequence, in the results as shown in FIG. 5(a) and FIG. 5(b), an actually measured region 31a', which corresponds to the low-temperature active region 31a where Cu is present in a higher concentration than Fe, can be seen, as can an actually measured region 31b' that corresponds to the high-temperature active region 31b where Fe is present in a higher concentration than Cu.

The state of the distribution of the Fe and Cu active components within the primary particle 31 may also be changed by adjusting the ion-exchange conditions used in the production of the NOx catalyst 3 shown in FIG. 4. For example, by adjusting the temperature conditions and reaction time for ion-exchange in such a manner that the Fe diffuses as far as the interior side of the primary particle 31, the prescribed distribution may be adjusted so as to produce a some degree of gradation in the distribution of the Fe and Cu active components, i.e., so as to have the Cu concentration increase in combination with a decline in the Fe concentration moving toward the interior side from the surface side of the primary particle 31. In this case, it is thought that the distributions of the Fe and Cu active components form distributions in which their contents and the active component ratio slowly change without forming clearly different regions as shown in FIG. 5. Even in the case of such distributions, a broad operating temperature region as described above can still be realized since the Fe is present at a higher concentration than the Cu at the surface side of the primary particle 31. The status of the distributions of the Fe and Cu active components within the primary particle 31 of the NOx catalyst 3 according to the present invention may also be acquired using instrumentation other than the EDX-equipped analytical instrumentation described above, and the analytical procedure, analytical instrumentation, and so forth should not be limited by the specifics of the NOx catalyst 3.

The results for the NOx catalyst 3 according to the present invention are compared herebelow with those for a tandem NOx catalyst (refer to FIG. 6) and a two-layer coated NOx catalyst (refer to FIG. 8), which are NOx catalysts in accordance with the prior art.

(1) Comparison with a Tandem NOx Catalyst

A tandem NOx catalyst is formed by the disposition of two NOx catalysts along the exhaust gas stream. The general tandem NOx catalyst in the prior art and as shown in FIG. 6 is formed, based on a consideration of the NOx purification performance in the high-temperature region, by disposing an Fe-exchanged NOx catalyst 41, provided by the ion-exchange of Fe active component with zeolite, on the upstream side and disposing a Cu-exchanged NOx catalyst 42, provided by the ion-exchange of Cu active component with zeolite, on the downstream side. For the Fe-exchanged NOx catalyst 41, a catalyst layer 41a, constituted of catalyst particles that have only Fe as the active component that exhibits a selective reduction activity for NOx, is formed on a catalyst substrate 41b, while for the Cu-exchanged NOx catalyst 42, a catalyst layer 42a, constituted of catalyst particles that have only Cu as the active component that exhibits a selective reduction activity for NOx, is formed on a catalyst substrate 42b.

At low temperatures, while the Fe-exchanged NOx catalyst 41 disposed on the upstream side cannot be said to have an excellent NOx reductive purification performance, the thusly structured tandem NOx catalyst is designed to maintain the NOx reductive purification performance for the NOx catalyst as a whole through the Cu-exchanged NOx catalyst 42, which can exhibit an NOx reductive purification performance in the low-temperature region. In addition, at high temperatures the reductive purification of the NOx in the exhaust gas is implemented by the NOx reductive purification performance of the Fe-exchanged NOx catalyst 41 disposed on the upstream side. At this time, if ammonia is present in the exhaust gas at the Cu-exchanged NOx catalyst 42 disposed on the downstream side, conversion to NOx by an oxidation reaction with the oxygen in the exhaust gas does end up being promoted; however, the consumption of the ammonia reducing agent by the Fe-exchanged NOx catalyst 41 on the upstream side can suppress this conversion to NOx.

The differences in the warm-up behavior during a cold start between the NOx catalyst 3 according to the present invention and this tandem NOx catalyst are described here based on FIG. 7. The line L3 in FIG. 7 shows the change in the catalyst temperature during a cold start for the NOx catalyst 3, while the line L4 shows the change in the catalyst temperature during a cold start for the Cu-exchanged NOx catalyst 42—that is, for the NOx catalyst designed to exhibit an NOx reductive purification performance at low temperatures—disposed on the downstream side of the tandem NOx catalyst. During a cold start, the factor that determines the completion of warm up of the NOx catalyst is the time required to achieve the active temperature of the Cu, which has a high selective reduction activity for NOx in the low-temperature region. With the NOx catalyst 3 according to the present invention, since both Cu and Fe have been ion-exchanged within the primary particle 31 and are thus both present, the catalyst temperature of the NOx catalyst 3 can be regarded as the same as the temperature reached by the Cu. Therefore, as shown in FIG. 7 T1 is designated as the time at which the temperature reached by the Cu has reached its active temperature.

On the other hand, the Fe-exchanged NOx catalyst 41 is disposed on the upstream side of the Cu-exchanged NOx catalyst 42 in the tandem NOx catalyst. Due to this, the exhaust gas travelling from the internal combustion engine 1 is first deprived of a portion of its heat by the Fe-exchanged NOx catalyst 41 and then reaches the Cu-exchanged NOx catalyst 42. As a result, for the same amount of heat in the exhaust gas from the internal combustion engine 1, the temperature ramp-up rate of the Cu-exchanged NOx catalyst 42, as shown by line L4 in FIG. 7, is smaller than the temperature ramp-up rate of the NOx catalyst 3, which is shown by the line L3. As a consequence, passage to time T2 (T2>T1) is required for the catalyst temperature of the Cu-exchanged NOx catalyst 42 to reach the Cu active temperature.

Based on the preceding, the NOx catalyst 3 according to the present invention has a faster cold start performance than does the tandem NOx catalyst according to the prior art. Moreover, as for the tandem NOx catalyst, since basically the Fe-exchanged NOx catalyst 41 and Cu-exchanged NOx catalyst 42 must each fulfill the NOx reductive purification performance in the operating temperature region corresponding thereto, the volume of each of these NOx catalysts must then be about the same as that of the NOx catalyst 3 according to the present invention. Due to this, the tandem NOx catalyst as a whole must inevitably have a large volume.

(2) Comparison with a Two-Layer Coated NOx Catalyst

As shown in FIG. 8, a catalyst layer 51 containing catalyst particles provided by ion-exchange between Fe active component and zeolite and a catalyst layer 52 containing catalyst particles provided by ion-exchange between Cu active component and zeolite are elaborated in a laminar configuration along the exhaust gas current to form a two-layer coated NOx catalyst 54. More specifically, with a general two-layer coated NOx catalyst, the Fe active component-containing catalyst layer 51 is positioned, based on a consideration of the NOx purification performance in the high-temperature region, above the Cu active component-containing catalyst layer 52 to form the two-layer coated NOx catalyst 54.

The thusly structured two-layer coated NOx catalyst exhibits a reductive purification performance for the NOx in an exhaust gas by the diffusion within the catalyst layers of the exhaust gas flowing in the exhaust gas conduit 2. For example, at low temperatures, while the Fe active component-containing catalyst layer 51 disposed on the upper side cannot be said to have an excellent NOx reductive purification performance, the design is such that the NOx reductive purification performance for the NOx catalyst 54 as a whole is maintained through the Cu active component-containing catalyst layer 52, which can exhibit an NOx reductive purification performance in the low-temperature region and is disposed on the lower side. In addition, at high temperatures the reductive purification of the NOx in the exhaust gas is implemented by the NOx reductive purification performance of the Fe active component-containing catalyst layer 51 disposed on the upper side.

A characteristic of this two-layer coated NOx catalyst 54 is that the NOx reductive purification performance by the NOx catalyst 54 undergoes a large variation as a function of temperature based on the ease of diffusion of the exhaust gas at the individual catalyst layers 51 and 52. For example, as shown by FIG. 9 and the line L5 in FIG. 10, a catalyst structure that emphasizes the NOx purification performance of the NOx catalyst 54 at low temperatures is provided when a high ease of exhaust gas diffusion is established for the catalyst layers 51 and 52. This occurs because, by structuring the NOx catalyst 54 such that the exhaust gas can easily reach into the catalyst layer 52 and of course also the catalyst layer 51, the NOx reductive purification performance by the Cu active component-containing catalyst layer 52 can be fully utilized at low temperatures, although at high temperatures the effect of the Cu active component present in the catalyst layer 52, i.e., the effect due to the conversion of ammonia to NOx, also ends up diminishing the NOx purification performance in the high-temperature region. In addition, as shown by FIG. 9 and the line L6 in FIG. 10, when a low ease of exhaust gas diffusion is established for the catalyst layers 51 and 52, this makes it difficult in particular for the exhaust gas to reach the Cu active component-containing catalyst layer 52 disposed on the lower side and thus provides a catalyst structure that emphasizes the NOx purification performance of the NOx catalyst 54 at high temperatures. This occurs because, while the NOx reductive purification performance due to the Cu active component-containing catalyst layer 52 cannot be fully utilized at low temperatures due to the difficulty in the exhaust gas reaching the catalyst layer 52, at high temperatures the NOx reductive purification performance due to the Fe active component-containing catalyst layer 51 can be fully utilized while at the same time the conversion of ammonia to NOx due to the Cu active component-containing catalyst layer 52 can be suppressed.

Accordingly, as shown in FIG. 10, it is difficult for the two-layer coated NOx catalyst 54 to exhibit good maintenance of a reductive purification performance for NOx (NOx purification rate) in a broad operating temperature region and the ease of exhaust gas diffusion in the catalyst layers 51 and 52 must be judiciously set in correspondence to the required reductive purification performance. In contrast to this, the NOx catalyst 3 according to the present invention, because both Cu and Fe have been ion-exchanged within the primary particle 31 and thus both are present, can exhibit a favorable reductive purification performance for NOx over a broad operating temperature region as shown by the line L7 in FIG. 10 and thus has better temperature characteristics than the two-layer coated NOx catalyst 54.

In addition, with the two-layer coated NOx catalyst 54, an Fe active component-containing catalyst slurry and a Cu active component-containing catalyst slurry must each be applied to the catalyst substrate 53. Moreover, since conditions such as the thickness of each catalyst layer 51 and 52 and the particle spacing in each catalyst layer 51 and 52 are factors connected to the ease of exhaust gas diffusion, the production conditions for forming each catalyst layer must be rigorously managed in order to obtain a desired NOx reductive purification performance, and the overhead involved with this production is thus not minor. With the NOx catalyst 3 according to the present invention, on the other hand, the catalyst substrate 3a is coated with one catalyst slurry in which both the Cu and Fe ion-exchanged within the primary particle 31 are present, and as a consequence a single catalyst layer must be managed and the production overhead involved with the NOx catalyst 3 is therefore substantially reduced from that for the two-layer coated NOx catalyst 54. In addition, since a single catalyst layer is present, a uniform ease of exhaust gas diffusion in this catalyst layer can easily be established and the catalyst particles present in the catalyst layer can then be efficiently utilized for the reductive purification of NOx.

EXPLANATION OF REFERENCE NUMERALS 1 internal combustion engine
2 exhaust gas conduit
3 NOx catalyst
3a catalyst substrate
3b catalyst layer
31 primary particle
31a low-temperature active region
31b high-temperature active region
32 secondary particle

The invention claimed is:

1. A selective NOx reduction catalyst having, on a catalyst substrate, a catalyst layer of a primary particle of catalyst particles, said primary particle being formed by ion-exchanging zeolite crystals with active components exhibiting a selective reduction activity for NOx, wherein the active components contains a first active component and a second active component that exhibits higher NOx reduction activity than the first active component at temperature within a temperature range that is lower than a specific temperature and exhibits lower NOx reduction activity than the first active component at temperature within a temperature range that is higher than the specific temperature, and the first active component and the second active component are disposed in the primary particle of the catalyst particles, and an active component ratio on a surface side of the primary particle is larger than an active component ratio on an interior side of the primary particle, with the active component ratio being a ratio of a concentration of the first active component to a concentration of the second active component in the primary particle.

2. The selective NOx reduction catalyst according to claim 1, wherein the active component ratio in the primary particle declines gradually from the surface side of the primary particle to the interior side thereof.

3. The selective NOx reduction catalyst according to claim 1, wherein, the catalyst particles are formed by ion-exchanging zeolite crystals with the first active component and thereafter by ion-exchanging the zeolite crystals with the second active component.

4. The selective NOx reduction catalyst according to claim 1, wherein the first active component is Fe and the second active component is Cu.

* * * * *